Figure 6:
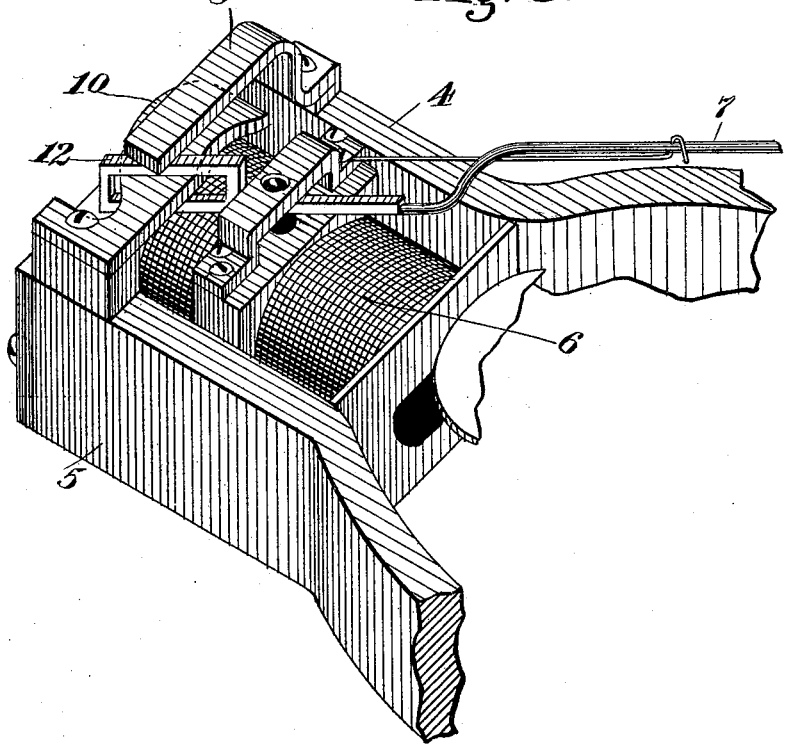

No. 636,182. Patented Oct. 31, 1899.
F. W. ROLLER.
ELECTRICAL MEASURING INSTRUMENT.
(Application filed Nov. 5, 1898.)
(No Model.) 2 Sheets—Sheet 1.
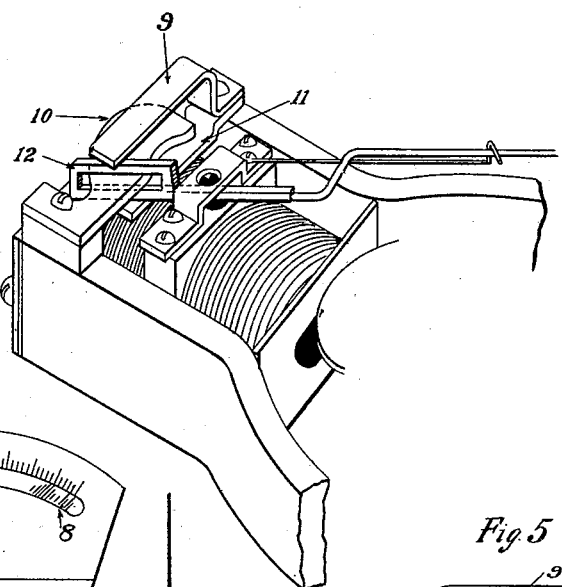
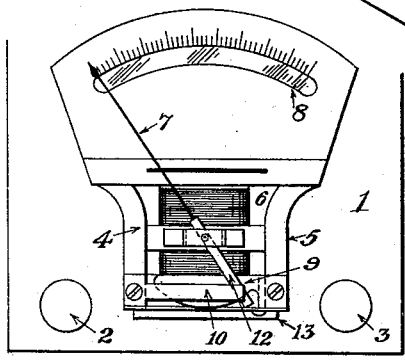
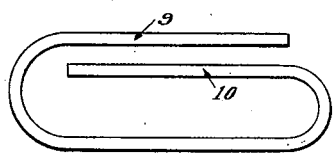
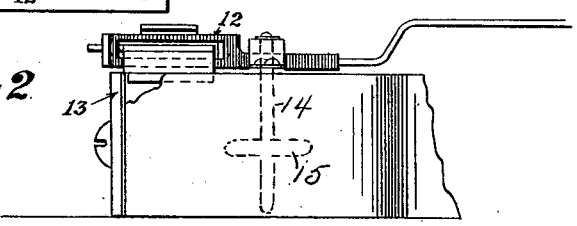
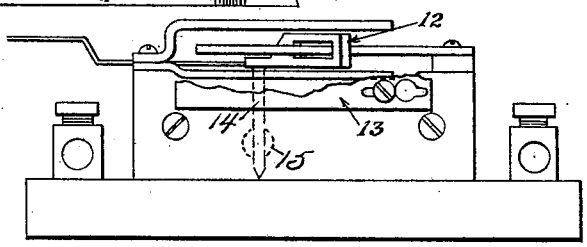
Witnesses
George A. Ryan
Geo. N. Hess.
Frank W. Roller
Inventor
By his Attorney
C. V. Edwards
THE NORRIS PETERS CO., PHOTO-LITHO., WASHINGTON, D. C.

No. 636,182. Patented Oct. 31, 1899.
F. W. ROLLER.
ELECTRICAL MEASURING INSTRUMENT.
(Application filed Nov. 5, 1898.)

(No Model.) 2 Sheets—Sheet 2.

WITNESSES:
Geo. B Rowley
Alex Ferguson

INVENTOR
Frank W. Roller,
BY C. V. Edwards.
ATTORNEY

UNITED STATES PATENT OFFICE.

FRANK W. ROLLER, OF NEW YORK, N. Y.

ELECTRICAL MEASURING INSTRUMENT.

SPECIFICATION forming part of Letters Patent No. 636,182, dated October 31, 1899.

Application filed November 5, 1898. Serial No. 695,593. (No model.)

*To all whom it may concern:*

Be it known that I, FRANK W. ROLLER, a citizen of the United States, residing at New York, in the county of New York and State of New York, have invented certain new and useful Improvements in Electrical Measuring Instruments, of which the following is a full, clear, and exact specification.

My invention relates to electrical measuring instruments, and particularly to the indicating device thereof.

The object of the invention is to provide a simple and effective means for "dead-beating" or reducing to a minimum the tendency of the indicating device, when actuated by the current to be measured, to swing by virtue of its inertia beyond the position which it normally holds under the influence of the current and afterward settle back and require a greater or less period of time in which to come to rest.

A further object of the invention is to provide an apparatus in which the foregoing object is attained and in which there will be no friction or other force tending to decrease the sensibility of the instrument.

The invention will be more particularly described with reference to the accompanying drawings, in which I have illustrated a type of instrument in common use having applied to it the invention.

In the drawings, Figure 1 is a perspective view of a portion of the instrument having applied thereto my invention. Fig. 2 is a side view, partly in section, of the device shown in Fig. 1. Fig. 3 is an end view of the portion shown in Fig. 1. Fig. 4 is a plan view of the instrument and invention. Fig. 5 is a detail view of a modified form of magnet, and Fig. 6 is a perspective view of a magnet having undivided pole-pieces.

Referring more particularly to the drawings, 1 represents the base-plate of the instrument, and 2 and 3 the usual binding-posts thereon.

4 and 5 are the opposite poles of the magnet, which in this instance is shown as a permanent magnet, although it is to be understood that the application of the invention is not limited to any particular type of instrument or magnet.

6 is the coil, through which the current to be measured is passed, 7 the indicating-needle, and 8 the calibrated scale, upon which the readings are indicated, it being understood that in the type of instrument here illustrated the shaft 14, upon which the needle is mounted, passes through the coil 6 and carries an armature 15 inside of the coil, the armature being adapted to be deflected from its normal position, and thus move the needle when the current passes through the coil, the extent of deflection increasing as the strength of the current increases.

Formed upon the respective pole-pieces 4 and 5, either integrally therewith or by independent pieces, are extension-pieces 9 and 10 of magnetic conducting material, preferably iron, and overlapping each other, substantially as shown, leaving a gap between the extension-pieces, the gap extending substantially between the poles of the magnet. If preferred, one of the poles may be bifurcated, as shown in Fig. 1, to form two parts 9 and 11, each overlapping the extension-piece 10, and thereby forming two gaps instead of one. A loop 12 of electric conducting material is attached to the needle and is adapted to swing with it. The loop 12 embraces one of the extension-pieces, preferably the middle one, where one of the pieces is bifurcated, and the loop is of such size and shape, as is also the extension-piece, to permit the free swinging of the needle and the free movement of the loop back and forth along the extension-piece. As the loop thus swings with the needle at least one of its sides will move in a path between the pole-pieces of the magnet and in the gap between the extension-pieces. It will be observed that the extension-pieces have no effect upon the armature 15.

In order to aid in the adjustment of the instrument, a keeper 13 of suitable size and conducting material may connect the pole-pieces of the magnet, and thus vary the strength of its field. This, however, is not necessarily a part of the construction here described and may be dispensed with, although it will be found in practice to be a simple and convenient means of adjustment.

Where the invention is to be applied to instruments in which no permanent magnet is employed, an independent magnet having overlapping pole-pieces may be used. In Fig. 5 I have shown a convenient form for such a magnet, which may be attached to the base-board or other convenient part of the instrument. In this instance of course the indicating device should be provided with the extension-loop embracing one of the overlapping poles of the magnet.

In the operation of the device above described the field between the poles of the magnet will be in the gap between the extension-pieces and the lines of force of the field will obviously be from extension-piece to extension-piece perpendicular to the gap. Consequently the side of the loop moving in the gap between the extension-pieces as the loop swings between the poles must cut these lines of force and in so doing produce at the extremities of the loop a difference of electrical potential. The loop being a closed circuit, the difference of potential will set up a current in the loop which will flow uninterrupted while the loop is moving in any one direction, and in so doing consume energy by doing work in overcoming the electrical resistance of the loop. As soon as the movement is reversed the direction of the induced current in the loop will also be reversed. The energy necessary to produce this induced current is necessarily taken from the energy which the moving parts have by virtue of their momentum. This will produce a dampening effect upon the swinging motion of the indicating device. When the needle has come to rest, there will be no further action of the loop or the lines of force on it, as this can only be exerted when there is relative motion between the two.

It is obvious that the above-described device may be applied to any type of instrument and may be adapted for use upon alternating or continuous currents or for the measurement of any characteristic of the current. Furthermore, the various parts may be interchanged or altered at will or the magnet made stationary or movable without departing from the scope or spirit of the invention.

Having thus described my invention, I declare that what I claim as new, and desire to secure by Letters Patent, is—

1. In an electrical measuring instrument, the combination of a magnet, a coil carrying the current to be measured, an indicating device operated by the current in said coil, two extension-pieces of magnetic conducting material, each connected with one of the poles of said magnet, said extension-pieces overlapping each other and having no influence upon said coil, and a loop of electric conducting material carried by said indicating device, one side being adapted to move between said extension-pieces, substantially as described.

2. In an electrical measuring instrument, the combination of a magnet, a stationary coil intermediate the poles of said magnet, an indicating device having an armature normally held in one position by the magnetism of said magnet, and adapted to be moved from said position when said coil is energized, two extension-pieces of magnetic conducting material each connected with one of said poles, said extension-pieces overlapping each other, and having no influence upon said coil, and a loop of electric conducting material carried by said indicating device, one side of said loop being adapted to move between said extension-pieces, substantially as described.

3. In an electrical measuring instrument, the combination of a magnet, a coil, an indicating device operated by the current in said coil, extension-pieces of magnetic conducting material connected with each of said poles, one of said extension-pieces being bifurcated and the sides thereof overlapping the other extension-piece, and a loop of electric conducting material carried by said indicating device, said loop surrounding the inner extension-piece, substantially as described.

4. In an electrical measuring instrument, the combination of a magnet, a coil, an indicating device operated by the current in said coil, extension-pieces of magnetic conducting material connected with each of said poles, one of said extension-pieces being bifurcated and the sides thereof overlapping the other extension-piece, said extension-pieces having no influence upon said coil, and a loop of electric conducting material carried by said indicating device, said loop surrounding the inner extension-piece, substantially as described.

5. In an electrical measuring instrument, the combination of an indicating device, operating mechanism therefor, a magnet having overlapping pole-pieces, said pole-pieces having no influence upon said operating mechanism, and a loop of electric conducting material carried by said indicating device, and having one side adapted to move between said overlapping pole-pieces, substantially as described.

In testimony whereof I affix my signature in presence of two witnesses.

FRANK W. ROLLER.

Witnesses:
CLARENCE KRUM,
C. V. EDWARDS.